(No Model.)

I. W. ARCHIBALD.
VEHICLE AXLE.

No. 333,049. Patented Dec. 22, 1885.

Witnesses.
Sam'l B. Dover,
Zeno T. Griffen

Inventor,
Isaac W. Archibald
By Jas. A. Cowles
Attorney.

UNITED STATES PATENT OFFICE.

ISAAC W. ARCHIBALD, OF ELGIN, ILLINOIS.

VEHICLE-AXLE.

SPECIFICATION forming part of Letters Patent No. 333,049, dated December 22, 1885.

Application filed June 30, 1885. Serial No. 170,237. (No model.)

*To all whom it may concern:*

Be it known that I, ISAAC W. ARCHIBALD, a citizen of the United States, residing in Elgin, in the State of Illinois, have invented a new and useful Improvement in Axle-Trees, of which the following is a specification.

My invention relates to improvements in axle-trees; and the novelty consists of the peculiar construction and combination of parts, substantially as hereinafter fully set forth, and specifically pointed out in the claims.

My invention has primarily for its object to provide means for taking up the wear on the hub; to prevent any rattling noise and the wheel from running out of "true," and to provide means which shall be simple, strong, and durable in construction, which can be easily and readily adjustable to take up the wear, and thoroughly effective in operation.

Figure 1:
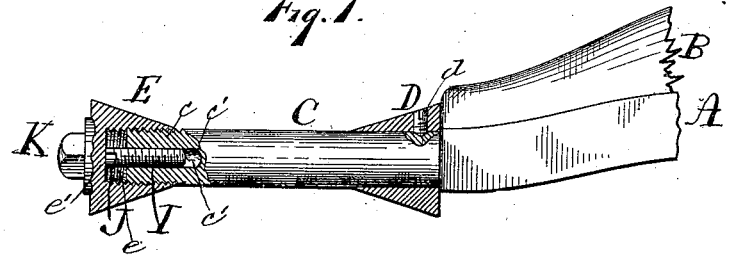
Figure 2:
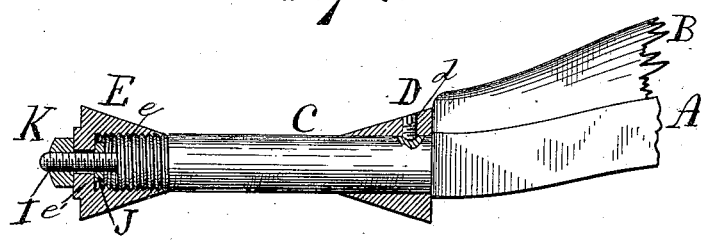
Figure 3:
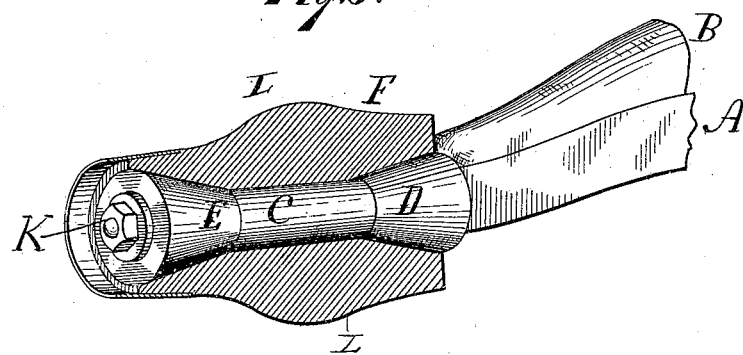

In the accompanying drawings, Figure 1 is an elevation of an axle, showing the conical bearings and a portion of the axle in section. Fig. 2 is a similar view of a modification; Fig. 3, a detail perspective showing the hub in position on the axle and in section.

Referring to the drawings, in which corresponding parts in the several figures are denoted by like letters of reference, A designates the axle; B, the wood part of the body secured on the axle. C is the spindle on which the hub is fitted. D E are the conical bearings located on the inner and outer ends of the spindle C. I is the securing-bolt, and K the clamping-nut, constructed and arranged as presently described. The axle and its spindle are of the ordinary well-known construction, and the outer end of the spindle is exteriorly screw-threaded, as at $c$, and has an interiorly-threaded socket, $c'$, formed therein in the direction of its longitudinal axis. The conical-bearing D is made hollow and tapering, as shown, and is provided with a threaded socket which carries an adjusting or tightening screw, $d$, which bears on the spindle of the axle to hold the bearing D rigidly and adjustably thereon. The socket or hollow portion of the bearing is of a diameter slightly larger than that of the spindle, so as to fit tightly thereon, and said bearing is arranged or fitted on the inner end of said spindle adjacent the wood part B. If desired, the screw $d$ may be slotted at its ends to enable a screw-driver to be fitted therein to adjust or tighten the screw and sleeve on the spindle, and the lower end of said screw may be fitted or bear in a countersunk seat in the spindle, while the upper end thereof fits flush with the upper end thereof fits flush with the outer face of the conical bearing D. (See Figs. 1 and 2.) The conical bearing E is fitted over the outer end of the spindle C, and it is provided with a socket, $e$, and a closed outer end or cap, $e'$. The socket $e$ of the conical bearing is threaded and fits over the threaded end of the spindle, and the cap $e'$ of said bearing has an aperture at or near its middle, through which a securing-bolt, I, passes and fits in the socket $c'$ of the spindle C.

J designates a jamb-nut fitted on the screwbolt I and bearing against the inner vertical face of the bearing-cap $e'$ within the socket $e$, in which it is arranged, and K designates a securing-nut bearing against the outer vertical face of the cap $e'$. The threaded bolt I and the nut K may be in one piece and of ordinary construction, the inner end of said bolt fitted or working in the threaded socket $c'$ of the spindle, as shown in Fig. 1, or the threaded bolt I may be formed integral with the outer end of the spindle or secured rigidly thereto, as shown in Fig. 2, and in this latter case the nuts J K are removable and separate therefrom and arranged in the manner hereinbefore described.

To secure the parts in position, the conical bearing D is slipped over the spindle and forced to the rear end thereof and properly adjusted or secured in position. The hub L is then fitted on the spindle, its conical bearing faces or sockets $l\ l'$ being adapted to fit on the conical bearings D E, respectively, and the conical bearing E, fitted on the threaded end of the spindle and secured in position by means of the nuts J K and bolt I. The jam-nut J is adjusted on the bolt I, so as to allow the conical bearing E to fit snugly and closely against the hub, and to force the same snugly against the bearing D, and at the same time allow the hub to rotate freely and easily thereon without undue friction. The securing-nut K adjusts and clamps the cap of the bearing E against the jam-nut, and prevents said bearing from outward movement, while the jam-nut J prevents inward movement of the said bearing, which is thus firmly and securely clamped in position and prevented from rotating or from having any lateral play in either direction. When the bearings D E or the socket of the hub L have become worn or loose, the jam-nut J or the set-screw I is moved inwardly for a short distance or set up slightly, which allows the conical bearing E to be adjusted closer to the hub to fit the socket thereof snugly, to prevent the wheel from running out of a straight line and stopping the rattling noise occasioned by the lateral play of the hub on the spindle. After the wheel has been used for a considerable length of time the hub thereof becomes worn and loose on the axle-spindle, and hence it is permitted a lateral play back and forth thereon when the wheel revolves and the wheel runs out of a true straight line, thus increasing the friction and wear on the parts and requiring greater exertion or power to draw the vehicle.

By my improved construction the conical bearing E is adjusted so as to be in close contact or fit snugly against the hub, and the wheel is thus brought to run in a true line by reason of the lateral play or loose motion thereof having been taken up by adjusting the conical bearing E.

My improved conical bearing E can be readily removed, to permit the wheel to be taken off, and as easily and readily replaced, and by having the removable conical bearings at each end the oil or lubricant is more effectually retained in the hub and prevented from escaping and becoming lost. The parts can be easily and readily removed in the case of breakage for repairs, and when the bearings have become worn to such a degree as to render them useless they can be replaced at a slight cost.

I am aware that it is not broadly new to provide an axle-tree with a conical bearing at opposite ends, and hence I disclaim this broad feature.

Having thus fully described my invention, what I claim as new, and desire to secure by Letters Patent, is—

1. The combination of the axle-spindle having a threaded end, an inner removable conical bearing, a conical bearing having a threaded socket adjustably fitted on the outer threaded end of the spindle, and provided with a perforated cap, a threaded bolt fitted to the spindle and passing through the cap of the outer bearing, and securing-nuts fitted on the bolt and bearing against the cap of the outer bearing, substantially as described.

2. The combination of the axle-spindle having a threaded outer end and a threaded socket, a removable conical bearing, D, having a tightening-screw fitted on the inner end of the spindle, an adjustable conical bearing, E, provided with a socket fitted on the threaded end of the spindle and having a perforated cap, a threaded bolt, I, fitted in the socket of the spindle and passing through the cap of the outer bearing in a jam-nut, J, arranged on the bolt within the socket of the bearing E, and fitted against the inner face of the cap thereof, and a securing-nut, k, bearing against the outer face of the bearing-cap E, substantially as described.

ISAAC W. ARCHIBALD.

Witnesses:
JOHN HARPER,
F. MONTGOMERY.